(12) United States Patent
Brostmeyer

(10) Patent No.: US 10,704,391 B1
(45) Date of Patent: Jul. 7, 2020

(54) GAS TURBINE ENGINE WITH AXIAL THRUST BALANCE

(71) Applicant: Florida Turbine Technologies, Inc., Jupiter, FL (US)

(72) Inventor: Joseph Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 421 days.

(21) Appl. No.: 15/603,911

(22) Filed: May 24, 2017

Related U.S. Application Data

(60) Provisional application No. 62/481,490, filed on Apr. 4, 2017.

(51) Int. Cl.
*F02C 3/08* (2006.01)
*F01D 5/02* (2006.01)
*F02C 3/04* (2006.01)
*F01D 25/16* (2006.01)
*F01D 25/24* (2006.01)

(52) U.S. Cl.
CPC ............... *F01D 5/027* (2013.01); *F01D 5/02* (2013.01); *F01D 25/16* (2013.01); *F01D 25/24* (2013.01); *F02C 3/04* (2013.01); *F05D 2220/32* (2013.01); *F05D 2240/35* (2013.01)

(58) Field of Classification Search
CPC ............... F04D 29/051; F04D 29/0513; F04D 29/0516; F04D 29/0416; F04D 29/041; F04D 29/0413; F05D 2240/52; F05D 2260/15; F02C 3/08
See application file for complete search history.

(56) References Cited

U.S. PATENT DOCUMENTS 5,167,484 A * 12/1992 Ponziani .................... F01D 3/04
                                                   415/1
2009/0277400 A1* 11/2009 Conry ....................... F01N 5/02
                                                   123/2

\* cited by examiner

*Primary Examiner* — Richard A Edgar
*Assistant Examiner* — Maxime M Adjagbe
(74) *Attorney, Agent, or Firm* — Koenig IP Works, PLLC

(57) ABSTRACT

A small aero gas turbine engine with an axial thrust limiter device that uses compressed air acting on a rotating disk extending from a rotor of the engine in which a forward pressure chamber and an aft pressure chamber applies a pressure to both sides of the rotating disk. When rotor is shifted, one side of the rotating disk has an increase in pressure acting on it to shift the rotor in an axial direction. Each pressure chamber includes an upper variable restriction and a lower variable restriction in which the restriction varies due to axial movement of the rotor. A forward and an aft foil bearing can also be used in addition to axial balance the rotor when not enough pressure is available such as at engine startup.

6 Claims, 3 Drawing Sheets

GAS TURBINE ENGINE WITH AXIAL THRUST BALANCE

CROSS-REFERENCE TO RELATED APPLICATIONS

This application claims the benefit to U.S. Provisional Application 62/481,490 filed on Apr. 4, 2017 and entitled AIR RIDING DISPLACEMENT LIMITER.

GOVERNMENT LICENSE RIGHTS

None.

BACKGROUND OF THE INVENTION

Field of the Invention

The present invention relates generally to a gas turbine engine, and more specifically to a gas turbine engine with axial thrust balance.

Description of the Related Art Including Information Disclosed Under 37 CFR 1.97 and 1.98

Rotating systems require a means to support the rotor system while at the same time allowing rotation over long periods of time with minimum drag and wear. Current methods accomplish this task utilizing oil-lubricated bearings to manage both radial and axial thrust loads of rotating machinery systems. These current methods require complex arrangements of bearing and lubrication systems and they add cost and weight, the latter of which is particularly important in small aero vehicles such as a UAV (Unmanned Aero Vehicle). The proposed invention is focused on providing a simple, affordable and workable solution to provide the required compensation for the axial thrust of rotating systems while providing a high degree of performance and durability and enabling a significant cost reduction.

BRIEF SUMMARY OF THE INVENTION

The present invention is an apparatus and a process for balancing an axial thrust on a gas turbine engine that uses only compressed air and not other fluids such as oil. In some rotating equipment applications, it is difficult to balance the axial thrust on a shaft which is created by pressure differences around the rotating components in the equipment. The axial thrust is a function of seal clearances which change transiently and over operational time. If the axial thrust is not balanced, the rotor will shift relative to the static hardware and may consequently interfere, or clash. Often times the axial thrust is compensated by force generated in an oil lubricated axial thrust bearing or through the balls of a ball bearing. This invention avoids lubricated axial thrust bearings and mechanical ball bearings to transmit the axial loads between the rotating and static components.

In one embodiment of the rotor with axial thrust balance, a disk attached to the rotor rotates within a cavity that forms a forward chamber and an aft chamber around the rotating disk. High pressure compressed air is supplied to both chambers. As the rotor shifts toward one of the chambers, the pressure on the contracting chamber will increase while the pressure in the increasing chamber will decrease due to leakage paths formed in the chambers closing or opening up. The pressure differential produced on the rotating disk will force the disk and thus the rotor to the side where the chamber pressure is lower until both chambers have equal pressures that balance the rotor.

In a second embodiment of the rotor with axial thrust balance, the rotating disk is also displaced by forward and aft foil bearings that function to balance the rotor when the high pressure source is not available such as at engine startup. The forward and aft foil bearings can be located in separate chambers from the pressure balancing chambers, or can be located within the pressure balancing chambers.

In a third embodiment, the forward and aft foil bearings are located in a separate device with a second rotating disk that the foil bearings act on.

DETAILED DESCRIPTION OF THE INVENTION

The present invention is a small gas turbine engine 13 with an axial thrust balancing device 11 that uses compressed air operating on a rotating disk 12 to balance the rotor 13. A forward cavity (chamber A) is located on a forward side of the rotating disk 12 and an aft cavity (chamber B) is located on an aft side of the rotating disk 12 and both cavities form variable pressure chambers (A and B) that move the rotating disk 12 and thus the rotor 13 in a forward or aft direction. Each chamber (A and B) is formed by two variable restrictions (A1, A2, B1, B2) that vary by movement of the rotor 13 and thus the rotating disk 12. A high pressure (PH) is applied to each of the two chambers (A and B). As the rotor 13 and thus the rotating disk 12 move in a forward or an aft direction, the one chamber will have the restrictions reduced while the other chamber will have the restrictions increased. A pressure in the chamber (A or B) with the reduced restrictions will see the pressure increase and thus move the rotating disk 12 and thus the rotor 13 to one direction and thus balance the rotor 13. For a micro-sized gas turbine engine, this axial thrust balancing design saves both weight and complexity over prior art axial thrust balancing devices that use oil and require closed loop fluid passages, a reservoir for oil, and a pump to pressurize the oil.

Figure 1:
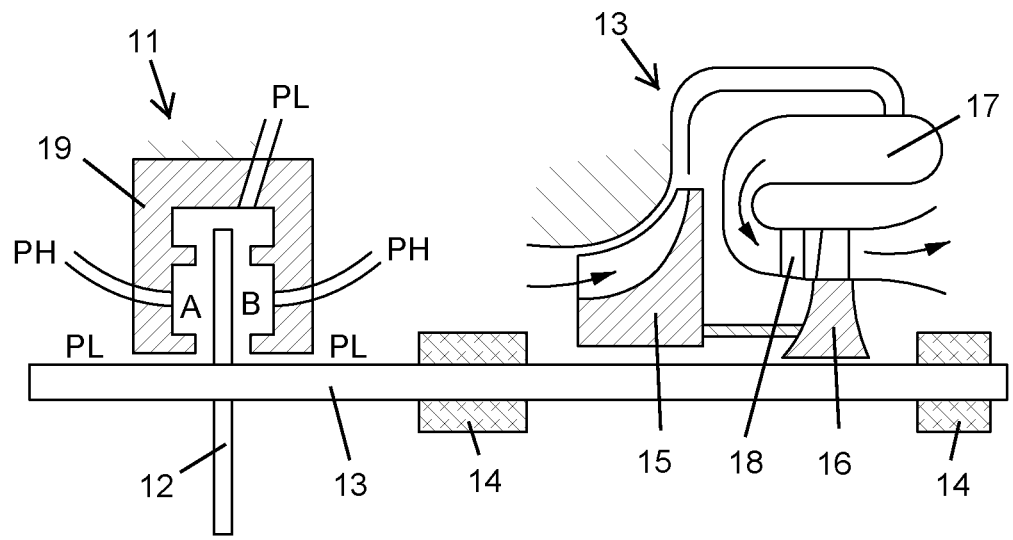
FIG. 1 shows a cross section view of a small gas turbine engine with an air riding displacement limiter of the present invention.

FIG. 1 shows a small gas turbine engine 13 with an air riding displacement limiter 11 of the present invention. The small gas turbine engine 13 includes a centrifugal compressor 15 that delivers compressed air to a combustor 17 to produce a hot gas flow, and a turbine 16 to pass the hot gas flow through and drive the compressor 15. A guide vane 18 is located upstream of a turbine rotor blade extending from the turbine disk 16. Two radial only load bearing bearings 14 are used to rotatably support the rotor 13. The compressor 15 could be of the type with a path for compressed air to the combustor and a bypass flow that propels the aircraft.

The air riding displacement limiter 11 is shown on the forward side of the rotor 13 and includes a rotating disk 12 extending from the rotor 13 and into a static housing 19 of the displacement limiter 11. The air riding displacement limiter 11 forms a forward chamber (A) and an aft or rearward chamber (B) in which compressed air acts against that side of the disk 12. A source of high pressure compressed air (PH) is delivered to both chamber A and chamber B. a low pressure (PL) discharge removes the compressed air that passes across gaps (A1, A2, B1, B2) that form each of the two chambers (A and B). The two pressure chambers (A and B) and the two upper variable restrictions (A1 and B1) and the two lower variable restrictions (A2 and B2) are formed within the static housing 19. As the rotor shifts forward or rearward, a pressure in the chamber that is reduced in size will have its pressure increased while the opposite chamber will have a decrease in pressure. Thus, the rotor 13 will be shifted to the side on which the lesser of the two pressures in chamber A or B will occur and balance the rotor. As the rotor 13 shifts due to this pressure difference between the two chambers (A and B), the pressure in the two chambers (A and B) will equalize and thus the rotor 13 will be balanced.

Figure 2:
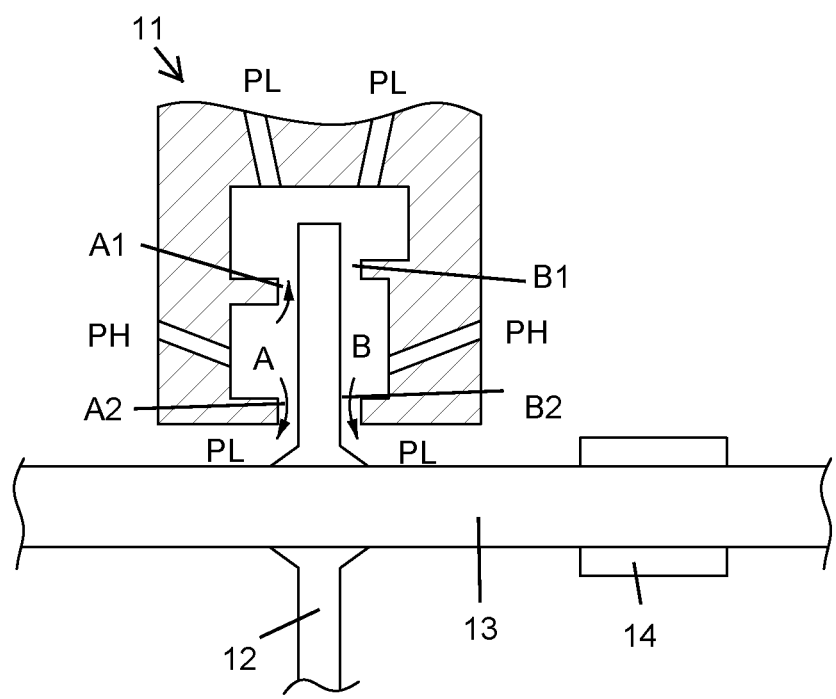
FIG. 2 shows a cross section view of the air riding displacement limiter of FIG. 1 in more detail.

FIG. 2 shows a detailed view of the air riding displacement limiter 11 of FIG. 1. Chamber A is formed by gap A1 and gap A2. Gap A1 can be considered as the upper gap while gap A2 can be considered as the lower gap. Chamber B also has gap B1 and B2 or an upper gap B1 and a lower gap B2. These gaps (A1, A2, B1, B2) change in size (flow restriction) as the rotor and thus the rotating disk 12 moves in the axial direction. A source of high pressure (PH) is applied to both chambers A and B. As the rotor 13 shifts in one direction along with the rotating disk 12, the size of the gaps (A1, A2, B1, B2) and thus the restriction produced will change. If the force on the gas turbine engine causes the rotor 13 to shift forward, then the gaps A1 and A2 will decrease in size while the gaps B1 and B2 will increase in size. Thus, the pressure in the chamber A (PA) will increase while the pressure in chamber B (PB) will decrease and thus shift the disk and thus the rotor 13 rearward or aft to balance the rotor. As the gaps (A1, A2, B1, B2) decrease in size, the restriction created by the gaps will increase and result in an increase in the pressure in the chamber due to a greater restriction for the compressed air to exit from the chamber.

The source of high pressure (PH) compressed air for the air riding displacement limiter 11 could be from the compressor 15 of the gas turbine engine 13. The low pressure (PL) air can just be discharged to atmosphere or used to cool a part of the engine such as the stator vanes or rotor blades.

In one embodiment of the present invention, chambers (A and B) could have the same size. In another embodiment, one chamber could be larger than the other chamber. When no axial load acts on the rotor, gaps (A1, A2) will equal gaps (B1, B2).

In another embodiment of the air riding displacement limiter of FIG. 2, two or more of these air riding displacement limiters 11 can be used on one rotor to balance the rotor.

Figure 3:
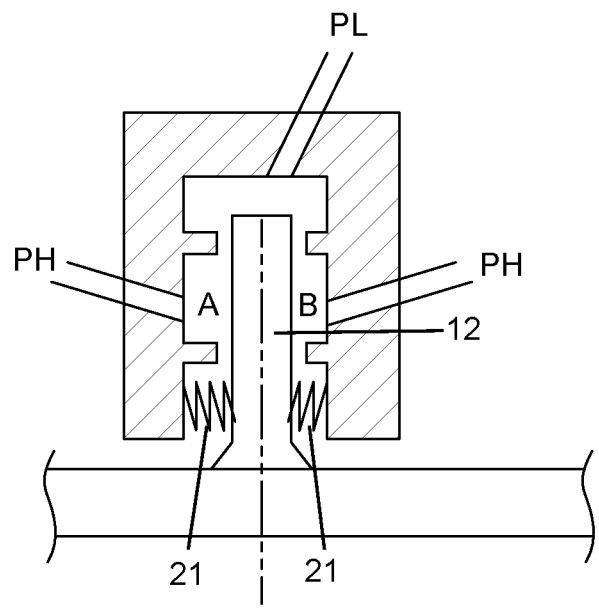
FIG. 3 shows an air riding displacement limiter in combination with two foil bearings according to a second embodiment of the present invention.

FIG. 3 shows a second embodiment of the present invention in which the air riding displacement limiter 11 includes two foil bearings 21 that each push the rotating disk 12 to one side or the other. The foil bearings provide a thrust balance when the engine is starting up and the high pressure (PH) is not yet available for use in the two chambers (A and B).

Figure 4:
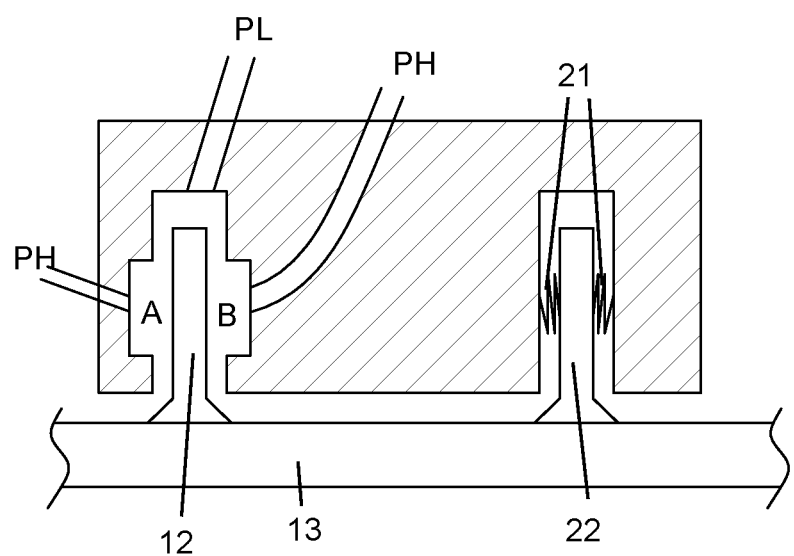
FIG. 4 shows an air riding displacement limiter in combination with two foil bearings according to a third embodiment of the present invention.

FIG. 4 shows a third embodiment in which the foil bearings 21 act on a separate rotating disk 22 from the rotating disk 12 of the air riding displacement limiter 11.

Figure 5:
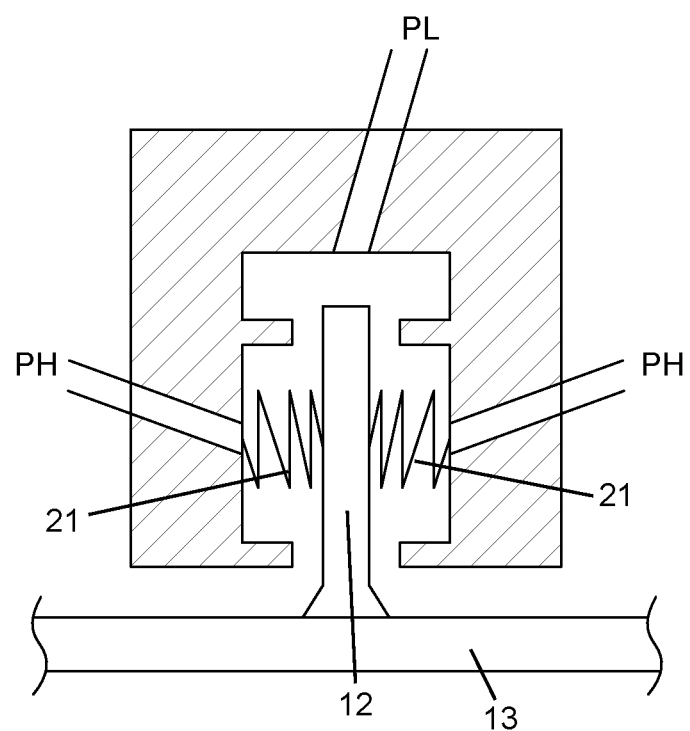
FIG. 5 shows an air riding displacement limiter in combination with two foil bearings according to a fourth embodiment of the present invention.

FIG. 5 shows a fourth embodiment in which the two foil bearings 21 are located within the two chambers (A and B) respectively and center the rotating disk 12 within the air riding displacement limiter 11.

The air riding displacement limiter 11 of the present invention can be used in combination with other thrust compensating devices such as an oil thrust piston. Also, the air riding displacement limiter 11 can be used with an axial damper to limit axial vibration. And, a rub tolerant material can be added to tips of the projections that form the gaps (A1, A2, B1, B2) in case of a large force imbalance occurs such as when a surge occurs.

I claim the following:

1. An aero gas turbine engine comprising:
   a rotor;
   a compressor;
   a combustor;
   a turbine, the turbine driving the compressor through the rotor from a hot gas stream produced in the combustor;
   a static housing, the static housing forming a forward pressure chamber and an aft pressure chamber, each of the forward pressure chamber and the aft pressure chamber having an upper variable restriction and a lower variable restriction;
   a source of compressed air, the source of compressed air supplying compressed air to each of the forward pressure chamber and the aft pressure chamber simultaneously; and
   an axial thrust balancing device associated with the rotor, the axial thrust balancing device including a rotating disk rotatable with the rotor and within the static housing, axial movement of the rotor increasing a pressure in one of the forward pressure chamber and the aft pressure chamber to balance the rotor in an axial direction.

2. The aero gas turbine engine of claim 1, wherein:
   the rotor is supported by two radial only load bearing bearings.

3. The aero gas turbine engine of claim 1, and further comprising:
   a forward foil bearing acting on a forward side of the rotating disk; and
   an aft foil bearing acting on an aft side of the rotating disk, the forward foil bearing and the aft foil bearing operating to balance the rotor in the axial direction.

4. The aero gas turbine engine of claim 3, wherein:
   the forward foil bearing is located inside of the forward pressure chamber; and
   the aft foil bearing is located inside of the aft pressure chamber.

5. The aero gas turbine engine of claim 1, wherein the rotating disk is a first rotating disk, the aero gas turbine engine further comprising:
   a second rotating disk extending from the rotor, the second rotating disk rotating within the static housing;
   a forward foil bearing acting on a forward side of the second rotating disk; and
   an aft foil bearing acting on an aft side of the second rotating disk, the forward foil bearing and the aft foil bearing acting on the second rotating disk operating to balance the rotor in the axial direction.

6. The aero gas turbine engine of claim 5, wherein:
the static housing contains both the first rotating disk and the second rotating disk in separate cavities.

\* \* \* \* \*